United States Patent [19]
Handa et al.

[11] Patent Number: 5,514,465
[45] Date of Patent: May 7, 1996

[54] MAGNETIC RECORDING MEDIUM COMPRISING A MAGNETIC LAYER CONTAINING MAGNETIC POWDER, AN ORGANIC DYE AND A BINDER HAVING AN AMINO GROUP OR AMMONIUM SALT GROUP

[75] Inventors: Takashi Handa; Kiminori Tamai, both of Nagano, Japan

[73] Assignee: TDK Corporation, Tokyo, Japan

[21] Appl. No.: 268,955

[22] Filed: Jun. 30, 1994

[30] Foreign Application Priority Data

Jun. 30, 1993 [JP] Japan .................... 5-187293

[51] Int. Cl.⁶ .................................... G11B 5/00
[52] U.S. Cl. .................. 428/328; 428/402; 428/403; 428/694 BA; 428/694 BG; 428/900
[58] Field of Search ................... 428/328, 402, 428/403, 694 BA, 694 BG, 900

[56] References Cited

U.S. PATENT DOCUMENTS

| | | | |
|---|---|---|---|
| 4,632,866 | 12/1986 | Kubota et al. | 428/328 |
| 4,663,084 | 5/1987 | Shirai et al. | 252/600 |
| 4,794,042 | 12/1988 | Kubota et al. | 428/328 |
| 4,937,098 | 6/1990 | Nishikawa et al. | 427/132 |
| 5,019,416 | 5/1991 | Honzawa | 427/47 |

FOREIGN PATENT DOCUMENTS

| | | |
|---|---|---|
| 60-71509 | 4/1985 | Japan . |
| 60-98525 | 6/1985 | Japan . |
| 60-124023 | 7/1985 | Japan . |
| 60-184576 | 9/1985 | Japan . |
| 60-211625 | 10/1985 | Japan . |
| 60-212821 | 10/1985 | Japan . |
| 61-261817 | 11/1986 | Japan . |
| 61-269225 | 11/1986 | Japan . |
| 62-3430 | 1/1987 | Japan . |
| 62-85403 | 4/1987 | Japan . |
| 62-86537 | 4/1987 | Japan . |
| 62-86531 | 4/1987 | Japan . |
| 512665 | 1/1993 | Japan . |
| 5266462 | 10/1993 | Japan . |

OTHER PUBLICATIONS

Database WPI, Derwent Publications, AN 87–047498, JP–A–62 006 435, Jan. 13, 1987.

Database WPI, Derwent Publications, AN 92–137252, JP–A–04 079 018, Mar. 12, 1992.

*Primary Examiner*—Stevan A. Resan
*Attorney, Agent, or Firm*—Oblon, Spivak, McClelland, Maier & Neustadt

[57] ABSTRACT

A magnetic layer containing a magnetic powder whose surface is composed mainly of carbon and/or iron carbide and a binder is provided on a non-magnetic substrate, the magnetic layer further contains an organic dye compound having at least one polar group selected from the group consisting of a hydroxyl group, a carboxylic acid group, a sulfonic acid group and a salt thereof, and the binder contains an amino group and/or an ammonium salt group. Due to the improved dispersibility of a magnetic paint, the magnetic recording medium of the invention is improved in surface morphology, magnetic properties, and electromagnetic properties.

6 Claims, No Drawings

1

MAGNETIC RECORDING MEDIUM COMPRISING A MAGNETIC LAYER CONTAINING MAGNETIC POWDER, AN ORGANIC DYE AND A BINDER HAVING AN AMINO GROUP OR AMMONIUM SALT GROUP

BACKGROUND OF THE INVENTION

1. Field of the Invention

This invention relates to magnetic recording media of the coating type including a variety of magnetic tapes.

2. Prior Art

Needle iron oxide is typical of the magnetic powders used in magnetic recording media. However, since the needle iron oxide as such cannot accommodate a demand for increased magnetic recording density, a variety of magnetic materials having high coercivity and high saturation magnetization have also been developed.

For example, iron carbide system magnetic powders in which at least the surface is of iron carbide are proposed in Japanese Patent Application Kokai (JP-A) Nos. 71509/1985, 124023/1985, 184576/1985, 211625/1985, 212821/1985, 269225/1986, 85403/1987, 86537/1987, 86531/1987, etc. Also the inventors proposed a magnetic powder whose surface is composed mainly of carbon in Japanese Patent Application No. 272057/1991. These powders are characterized by high coercivity, high saturation magnetization, good electrical conductivity, and effective light shielding.

These prior art proposals, however, are insufficient in packing density and orientation of the magnetic layer because the dispersibility of magnetic powder in a binder is not taken into account. For example, some of the above-referred publications disclose to add fatty acids such as lauric acid and stearic acid to a magnetic paint as a dispersant, but such means alone is still insufficient in packing density and orientation.

Then the inventors proposed in Japanese Patent Application No.338016/1992 to increase the dispersibility of a magnetic powder whose surface is composed mainly of carbon or iron carbide by subjecting the magnetic powder to pre-treatment by kneading and dispersing the magnetic powder optionally with an anionic or ampholytic surfactant and a fatty acid, and using a resin containing an amino or ammonium salt group as a binder. However, gloss and surface roughness are still insufficient. There often occur coating defects such as longitudinal streaks. A further improvement in electromagnetic properties is also desired.

DISCLOSURE OF THE INVENTION

A primary object of the present invention is to provide a magnetic recording medium which is improved in surface morphology, coating properties, magnetic properties, and electromagnetic properties by increasing the dispersibility in a magnetic paint of a magnetic powder whose surface is composed mainly of carbon or iron carbide.

This and other objects are attained by the present invention which is defined below as (1) to (6).

(1) A magnetic recording medium comprising on a non-magnetic substrate a magnetic layer containing a magnetic powder whose surface is composed mainly of carbon and/or iron carbide and a binder, said magnetic layer containing an organic dye compound having a polar group.

(2) The magnetic recording medium of (1) wherein said polar group is at least one selected from the group consisting of a hydroxyl group, a carboxylic acid group, a sulfonic acid group and a salt thereof.

(3) The magnetic recording medium of (1) wherein the content of said organic dye compound is 0.5 to 10 parts by weight per 100 parts by weight of said magnetic powder.

(4) The magnetic recording medium of (1) wherein said binder contains an amino group and/or an ammonium salt group.

(5) The magnetic recording medium of (1) wherein said magnetic powder is one obtained by previously kneading and dispersing a magnetic powder whose surface is composed mainly of carbon and/or iron carbide in a solvent.

(6) The magnetic recording medium of (1) wherein a magnetic paint containing the magnetic powder whose surface is composed mainly of carbon and/or iron carbide, the binder, and the organic dye compound having a polar group is coated onto the non-magnetic substrate for improving coating defects at the surface of the magnetic layer.

OPERATION AND BENEFITS

The magnetic recording medium of the invention includes a magnetic layer containing a magnetic powder whose surface is composed mainly of carbon and/or iron carbide and a binder on a non-magnetic substrate. The magnetic layer further contains an organic dye compound having a polar group or a salt thereof. Preferably the binder used is one containing an amino group and/or an ammonium salt group.

In preparing a magnetic coating composition or paint containing these components, the magnetic powder is preferably subject to a pre-treatment by kneading and dispersing it in a solvent. Preferably, the organic compound is also mixed and dispersed during this pre-treatment, obtaining a magnetic paint containing the binder.

The thus prepared magnetic paint is enhanced in the dispersibility of the magnetic powder and for unknown reasons, is changed in viscosity and reduced in yield value. As a result, the magnetic layer is increased in surface gloss and reduced in surface roughness, that is, improved in surface morphology. Also the frequency of unacceptable appearance resulting from coating defects at the magnetic layer surface such as longitudinal streaks which are observable under a microscope is reduced, indicating improved coating properties. These lead to significant benefits including improved magnetic field orienting effect, an increased squareness ratio, and improved electromagnetic properties such as RF output.

A lowering of yield value is recognized significant particularly when the magnetic powder whose surface is composed mainly of carbon or iron carbide is combined with the organic dye compound. These significant benefits resulting from such improved dispersibility and a reduced yield value are not obtained from those magnetic paints which are prepared by using commonly used magnetic powders, for example, fine powders of Fe, Co, Ni and alloys thereof, and oxide fine powders such as $\gamma\text{-Fe}_2\text{O}_3$, cobalt-doped $\gamma\text{-Fe}_2\text{O}_3$, $\text{Fe}_3\text{O}_4$, cobalt-doped $\text{Fe}_3\text{O}_4$, $\text{CrO}_2$, barium ferrite and strontium ferrite and adding the organic dye compound thereto.

It is disclosed in JP-A 98525/1985, 261817/1986 and 3430/1987 to improve the dispersibility of magnetic powder in the magnetic layer by adding thereto an organic dye compound as mentioned above. These publications, however, disclose only those examples of employing commonly used magnetic powders such as metal or alloy magnetic powders and oxide fine powders as mentioned above. The dispersibility and dispersion stability are increased and electromagnetic properties are improved with satisfactory gloss values. Note that no reference is made to an improvement in coating properties.

ILLUSTRATIVE CONSTRUCTION

Now the illustrative construction of the present invention is described in more particularity.

The magnetic recording medium of the invention includes a magnetic layer which contains a magnetic powder comprised of magnetic particles whose surface is composed mainly of carbon and/or iron carbide, an organic dye compound, and a binder.

The magnetic powder whose surface is composed of iron carbide may be prepared by mixing an iron cyanide with a sulfate, sulfite or sulfide, placing the mixture in an iron-made reactor, and heat reducing the mixture while introducing CO into the reactor, followed by cooling. It may also be prepared by reducing an iron oxide, for example, iron oxyhydroxides such as $\alpha$-FeOOH (goethite), $\beta$-FeOOH (akaganite) and $\gamma$-FeOOH (lepidocrocite), etc. or iron oxides such as $\alpha$-Fe$_2$O$_3$, $\gamma$-Fe$_2$O$_3$, Fe$_3$O$_4$, $\gamma$-Fe$_2$O$_3$-Fe$_3$O$_4$ (solid solution), etc., with carbon monoxide or a gas mixture of hydrogen and carbon monoxide as disclosed in JP-A 71509/1985 and 124023/1985.

An alternative preparation method is by reducing a slurry mixture of any of these iron oxides in an aqueous colloidal carbon black particle suspension with hydrogen, carbon monoxide or a mixture of hydrogen and carbon monoxide. Examples of the iron cyanides which can be used herein include hexacyano iron salts such as Turnbull's blue, Berlin white, etc., and ferro- and ferricyanides such as potassium ferrocyanide, sodium ferrocyanide, potassium ferricyanide, sodium ferricyanide, etc. Examples of the additives which can be used herein include sulfates such as potassium sulfate, sodium sulfate, ammonium sulfate, iron sulfate, sodium hydrogen sulfate, and potassium hydrogen sulfate; sulfites such as potassium sulfite, sodium sulfite, ammonium sulfite, and potassium hydrogen sulfite; and sulfides such as sodium thiosulfate, potassium thiosulfate, sodium sulfide, potassium sulfide, iron sulfide, sodium rhodanide, potassium rhodanide, sodium isothiocyanate, and potassium isothiocyanate. The gas used in the heat reducing atmosphere is not limited to CO, and carbon-bearing reducing gases such as CH$_4$, water gas, and propane may also be used. Alternatively, pure iron particles are formed and subjected to any of the foregoing heat reducing treatments. For reduction purpose, a heating temperature of about 300° to 700° C. and a heating time of about 30 minutes to about 10 hours may be employed.

There is thus produced a magnetic powder represented by the formula Fe$_n$C wherein n≧2, especially n is from 2 to 3. Although it is not necessary that n be an integer or the material have a stoichiometric composition, there are often formed Fe$_2$C, Fe$_5$C$_2$, and Fe$_3$C. Particles may have a graded concentration, and iron carbide need not necessarily be present throughout particles insofar as iron carbide is present at the surface.

The magnetic powder whose surface is composed mainly of carbon may be prepared by heat treating the aforementioned iron carbide powder in a non-oxidizing atmosphere, especially in a non-oxidizing or inert gas atmosphere such as nitrogen, at 300° to 400° C. for 12 to 48 hours. The thus obtained magnetic powder is a black powder having a carbon base surface and an iron base internal core. The iron is present essentially as $\alpha$-iron in the particle core. This magnetic powder exhibits significantly high $\sigma$s and good retention of magnetic properties with time as compared with conventional metallic magnetic powders obtained by reducing iron oxide.

The presence of carbon at the magnetic powder surface can be judged by effecting secondary ion mass spectroscopy (SIMS) analysis to detect whether or not a C—C bond is present. The presence of $\alpha$-iron can be confirmed by X-ray diffractometry (XRD). Preferably, the magnetic powder contains up to 20%, especially about 5 to 15% by weight of carbon with the balance of essentially $\alpha$-iron because this composition ensures very high $\sigma$s. Carbon contents insure retention of magnetic properties with time whereas $\sigma$s becomes low with too high carbon contents.

The above-mentioned magnetic powder whose surface is composed mainly of carbon or iron carbide is in needle or granular form and may be suitably selected in accordance with the intended application of the magnetic recording medium although particles having a major diameter or length of 0.1 to 1 µm and an aspect or length-to-breadth ratio of from 1 to 20 are generally used. Needle form particles destined for video and audio tapes preferably have a length of 0.1 to 0.5 µm and a needle ratio of from 4 to 15.

Also, especially the magnetic powder having a carbon base surface should preferably have a specific surface area of about 20 to 70 m$^2$/g as measured by BET based on nitrogen adsorption. It has a coercivity Hc of 1,000 to 1,800 Oe, especially 1,200 to 1,600 Oe and a saturation magnetization $\sigma$s of at least 140 emu/g, especially 150 to 170 emu/g. It will be understood that a mixture of carbon and iron carbide may be present at the surface of magnetic powder according to the present invention.

In addition to the magnetic powder whose surface is composed mainly of carbon or iron carbide, the magnetic powder used in herein may contain any of well-known magnetic powders, for example, oxide fine powders such as $\gamma$-Fe$_2$O$_3$, cobalt-doped $\gamma$-Fe$_2$O$_3$, Fe$_3$O$_4$, cobalt-doped Fe$_3$O$_4$, CrO$_2$, barium ferrite and strontium ferrite and fine powders of Fe, Co, Ni and alloys thereof, in an amount of up to 50% by weight of the entire magnetic powder.

Preferably the content of magnetic powder in the magnetic layer is 70 to 95% by weight, more preferably 80 to 90% by weight. Higher contents would make it difficult to improve surface smoothness by calendering whereas with lower contents, the magnetic layer tends to lower its magnetic properties.

The organic dye compound used herein has a polar group which is preferably a hydroxyl group, a carboxylic acid group, a sulfonic acid group or the like. The organic dye compounds has such a polar group include azo compounds, for example, β-naphthol systems, β-oxynaphthoic acid systems, β-oxynaphthoic anilide systems, acetoacetic anilide systems, acetoacetic aminobenzimidazolone systems, pyrazolone systems, and fused azo systems, fused polycyclic compounds such as phthalocyanine systems, quinacridone systems, anthraquinone systems, perylene systems, perinone systems, thioindigo systems, dioxazine systems, isoindolenone systems, quinophthalone systems, and triphenylmethane systems, and metal complex compounds, such as azo, nitroso and azomethine systems. These compounds may take the form of a ligand without forming a complex with a metal. Also included are dyeing lake compounds, for example, acidic dye lake systems and basic dye lake systems. The polar group may be attached to the organic dye compound directly or through a saturated or unsaturated alkylene or arylene group having 1 to 20 carbon atoms which may be substituted directly or through a carboxylic amide or sulfonic amide.

The polar group may form a salt with a mono- or di-valent metal cation or organic ammonium. Exemplary metals that form the metal salt are Na, K, Mg, Ca, Zn, Ba, Sr, Mn, Fe, Ni, Co, etc. The ammonium salt may be ammonium or any of aliphatic primary to quaternary ammonium salts.

Preferably one to five polar groups, especially one to two polar groups are contained in the organic dye compound per molecule. Less polar groups would detract from dispersibility whereas too much polar groups would obstruct the bond between the magnetic powder surface and the binder, also detracting from dispersibility.

In addition to the polar group, the organic dye compound used in the magnetic layer of the magnetic recording medium of the invention may have a substituent, for example, a saturated or unsaturated alkyl group having 1 to 20 carbon atoms, aryl group, halogen atoms, $-OR_1$, $-NR_1R_2$, $-CONR_1R_2$, $-SO_2NR_1R_2$, $-SR_1$, $-CN$, $-NO_2$, $-NR_1COR_2$, $-NR_1SO_2R_2$, $-COOR_3$, $-OCOR_2$ wherein each of $R_1$ and $R_2$ is H, a saturated or unsaturated alkyl group having 1 to 20 carbon atoms or an aryl group, and $R_3$ is a saturated or unsaturated alkyl group having 1 to 20 carbon atoms.

Containment of one or more of these compounds and a magnetic powder whose surface is composed mainly of carbon or iron carbide not only improves the dispersion of the magnetic powder in the magnetic paint, but also offers the significant benefits that the magnetic paint is changed in viscosity and reduced in yield value.

Preferably the content of the organic dye compound is 0.5 to 10 parts by weight, more preferably 3 to 7 parts by weight per 100 parts by weight of the magnetic powder. Higher contents would allow the organic dye compound to precipitate out of the magnetic layer, inviting clogging of the magnetic head. Lower contents would be less effective for improving the dispersion of magnetic powder in the magnetic paint and lowering the yield value. The organic dye compound is present dispersed in the magnetic layer while its diameter is of the order of 5 nm to 20 nm.

In the practice of the invention, the magnetic powder whose surface is composed mainly of carbon or iron carbide is preferably pretreated for precluding aggregation of the powder and causing the powder to bear the organic dye compound thereon for providing improved dispersion with the binder as will be described later. More particularly, the magnetic powder and an organic solvent may be admitted into a ball mill, optionally together with one or more organic dye compounds, and agitated therein for milling and dispersion, or they may be kneaded and dispersed in a kneader.

The organic solvent used herein is not particularly limited and may be any of solvents commonly used in magnetic coating compositions, for example, one or more of the solvents which will be described later. Most effective are ketone and aromatic solvents, especially cyclohexanone, methyl ethyl ketone, methyl isobutyl ketone, and toluene. More than one of these ketone and aromatic solvents may be used. Alternatively, various organic solvents which will be described later may be mixed into a mixture wherein ketone and aromatic solvents occupy more than 50% by weight.

Preferably the amount of solvent mixed with the magnetic powder in the pre-treatment step is 20 to 50% by weight based on 100 parts by weight of the magnetic powder. Excess amounts could not fully eliminate aggregation whereas lesser amounts would cause fracture of particles.

In the pretreatment step, the kneading time is about 15 minutes to 12 hours. Then the organic solvent is borne on at least a portion of the magnetic powder surface. In this regard, the solvent not only covers the surface, but can also penetrate into the magnetic powder. The organic solvent can undergo air oxidation or be modified by magnetic particles whereupon the modified solvent covers the magnetic powder surface.

The magnetic powder which has been pre-treated in this way so as to carry the solvent and the organic dye compound thereon is further kneaded with the organic solvent along with the binder, inorganic fine particles, and optionally, a dispersant other than the organic dye compound, a lubricant, and other additives, obtaining a magnetic paint or coating composition.

The preferred binder used herein is a binder containing an amino group or an ammonium salt group. The binder used herein may be obtained by copolymerizing a monomer containing an amino group or an ammonium salt group or by reacting a resin with amine or the like for amino or ammonium modification. Preferably the binder resin contains about 300 to 1,000 ppm of N from the amino group or ammonium salt group in its molecule. Higher contents would allow for agglomeration between binder molecules, detracting from dispersibility. Lower contents would also fail to achieve satisfactory dispersion.

The resin containing an amino group and/or ammonium salt group as a functional group preferably has a number average molecular weight of about 10,000 to 200,000. Exemplary resin skeletons include vinyl chloride-(meth)acrylate copolymers (which may contain an epoxy group), vinyl chloride-vinyl acetate copolymers (which may contain carboxylic acids), vinyl chloride-vinyl alcohol-vinyl acetate copolymers (which may contain carboxylic acids), phenolic resins, epoxy resins, urethane resins, vinyl chloride-vinylidene chloride copolymers, urea resins, butyral resins, formal resins, melamine resins, alkyd resins, etc. An amino or ammonium group is introduced into these resin skeletons, often at their side chain.

The resin containing an amino group or ammonium salt group should occupy at least 50% by weight of the entire binder. The binder used herein may be an electron beam curable, thermoplastic, thermosetting or reactive resin or a mixture thereof although the thermosetting and electron beam curable resins are preferred for film strength and other reasons. Where another resin free of an amino group or ammonium group is additionally used, it may be selected from conventional well-known resins. The binder content of the magnetic layer is not particularly limited although the binder content is preferably 15 to 25 parts by weight per 100 parts by weight of the magnetic powder.

Preferred examples of the thermosetting resins include mixtures of a crosslinking agent and a vinyl copolymeric resin such as vinyl chloride-(meth)acrylate copolymers (which may contain an epoxy group), vinyl chloride-vinyl acetate copolymers (which may contain carboxylic acid), vinyl chloride-vinyl alcohol-vinyl acetate copolymers (which may contain carboxylic acid), vinyl chloride-vinylidene chloride copolymers, chlorinated polyvinyl chloride, vinyl chloride-acrylonitrile copolymers, vinyl butyral copolymers, vinyl formal copolymers, etc.; mixtures of a crosslinking agent and a cellulosic resin such as nitrocellulose, cellulose acetobutyrate, etc.; mixtures of a crosslinking agent and a synthetic rubber such as butadiene-acrylonitrile, etc.; resins of condensation polymerization type such as phenol resins, epoxy resins, polyurethane curable resins, urea resins, butyral resins, formal resins, melamine resins, alkyd resins, silicone resins, acrylic reactive resins, polyamide resins, epoxypolyamide resins, saturated polyester resins, and ureaformaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; and mixtures of any one of the foregoing condensation polymerization resins and a crosslinking agent such as isocyanates, wherein these resins contain an amino group or ammonium salt group.

The crosslinking agents which can be used to cure these binder resins include various polyisocyanates, preferably diisocyanates such as tolylene diisocyanate, hexamethylene diisocyanate and methylene diisocyanate. These crosslinking agents are reactive with hydroxyl, amino or ammonium salt groups in the binder resins, thereby causing crosslinking of the binder resins. Usually 10 to 30 parts by weight of the crosslinking agent is used per 100 parts by weight of the resin. These thermosetting resins are generally cured by heating in an oven at 50° to 70° C. for 12 to 48 hours.

Among the preferred binders are electron beam-curable resins, that is, resins obtained by curing electron beam-curable compounds. Illustrative electron beam-curable resins are thermoplastic resins having contained or incorporated in their molecule groups capable of crosslinking or polymerizing upon exposure to electron beams, for example, acrylic double bonds as given by acrylic and methacrylic acids having an unsaturated double bond capable of radical polymerization and esters thereof, allyl double bonds as given by diallyl phthalate, and unsaturated bonds as given by amine-modified maleic acid and maleic derivatives. Other compounds having unsaturated double bonds capable of crosslinking or polymerizing upon exposure to electron beams may also be used.

The thermoplastic resins which can be modified into electron beam-curable resins include, for example, vinyl chloride copolymers, vinyl chloride-vinyl acetate-vinyl alcohol copolymers, vinyl chloride-acrylic copolymers, epoxy resins of saturated polyesters, urethane resins, phenoxy resins, and cellulosic resins. They may be acryl modified in a conventional manner. Thereafter, amino or ammonium salt groups are incorporated therein.

Preferably, these resins have a number average molecular weight of 5,000 to 50,000.

Inorganic fine particles such as $\alpha$-$Al_2O_3$, $Cr_2O_3$, $TiO_2$, SiC and $\alpha$-$Fe_2O_3$ may be added to the magnetic paint for enhancing the mechanical strength of a magnetic layer formed therefrom. If desired, the magnetic paint may further contain lubricants such as carbon black and silicone oil and various other additives.

Further, another dispersant such as a surfactant may be used in combination with the organic dye compound. The surfactants used herein are preferably anionic and ampholytic surfactants. The preferred anionic surfactants used herein are those having a hydrophilic group in the form of a carboxylate salt, sulfonate salt, sulfate ester, phosphate ester, taurinate salt or phosphonate salt. The ampholytic surfactants are preferably those having betaine, phosphocholine, amic acid, aminosulfate, sulfobetaine, etc. as a hydrophilic group. These dispersants may be added during the above-mentioned pretreatment as is the organic dye compound.

The solvent used in the magnetic paint is not particularly limited, but is preferably selected from ketones such as cyclohexanone, methyl ethyl ketone and methyl isobutyl ketone, esters such as ethyl acetate and butyl acetate, aromatics such as toluene and xylene, tetrahydrofuran, and dimethylformamide alone or mixtures thereof. The amount of the solvent used in the magnetic paint is not particularly limited although about 150 to 1,000 parts by weight of the solvent is preferably mixed with 100 parts by weight of the ferromagnetic powder.

The magnetic paint having a composition as mentioned above is coated onto a non-magnetic substrate to form a magnetic layer which is subject to orientation, drying, calendering, curing and the like before a magnetic recording medium is obtained.

The material of which the non-magnetic substrate is made is not particularly limited and may be selected for a particular purpose from various flexible materials and various rigid materials and configured to a predetermined shape (such as tape) and size meeting any desired one of the standards. Exemplary flexible materials are various resins including polyesters such as polyethylene terephthalate and polyethylene naphthalate and polyamides.

Although the thickness of the magnetic layer varies with a particular application and purpose, it is generally about 0.1 to 4 $\mu$m thick. If desired, the magnetic layer may have a multi-layer structure, an undercoat layer may be formed between the non-magnetic substrate and the magnetic layer, and a backcoat layer may be provided.

EXAMPLE

Examples of the present invention are given below by way of illustration.

Example 1

An iron carbide powder consisting essentially of $Fe_5C_2$ was heat treated in $H_2$, obtaining a magnetic powder having a coercivity Hc of 1,550 Oe, a saturation magnetization $\sigma s$ of 150 emu/g, and a specific surface area of 60 $m_2$/g as measured by a BET method. On SIMS analysis of this powder, the presence of C—C bond and predominance of carbon on the surface were ascertained. On X-ray diffractometry, the peak of $Fe_5C_2$ almost disappeared and the peak of $\alpha$-Fe newly appeared. The carbon content was about 10% by weight.

This magnetic powder, 15 grams, was admitted into a vibratory ball mill having an internal volume of 100 ml charged with 230 grams of steel balls with a diameter of 2.5 mm. To the magnetic powder was added 4.5 grams of methyl ethyl ketone as a solvent. The ingredients were kneaded and dispersed at room temperature for one hour. Thereafter, 0.45 gram of an organic dye compound I shown below was added and the ingredients were further kneaded and dispersed for ½ hour.

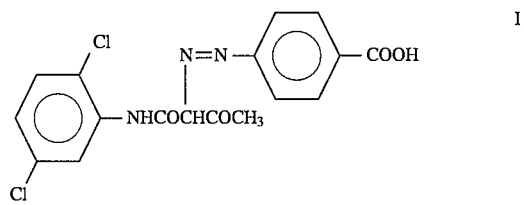

Using the magnetic powder having the solvent and organic dye compound carried thereon, the following composition was prepared.

| Composition | |
|---|---|
| Magnetic powder | 100 pbw |
| Dispersant (organic dye compound I) | 3 pbw |
| Vinyl chloride resin | 14 pbw |
| polar group: ammonium salt group | |
| (average ammonium salt group | |
| per molecule: 500 ppm of N) | |
| degree of polymerization: ~310 | |
| Polyurethane resin | 6 pbw |
| acid: t-PhA/i-PhA/AA  glycol: | |
| NPG/HG/EG/MPD | |
| chain extender: NPG  isocyanate: MDI | |
| polar group: sulfonic acid group, ammonium salt | |
| group number average molecular weight: ~19,000 | |
| α-Al$_2$O$_3$ | 10 pbw |
| Stearic acid | 1 pbw |
| Butyl stearate | 0.5 pbw |
| Methyl ethyl ketone | 105 pbw |
| Toluene | 70 pbw |
| Cyclohexanone | 105 pbw |

The composition was dispersed in a vibratory ball mill. Then 3 parts by weight of tolylene diisocyanate was added to the composition, which was coated onto a polyester film of 22 μm thick and dried in an orienting magnetic field of 2,000 G applied. The coating was then subject to calendering under a gage pressure of 21 kg/cm$^2$ (linear pressure 200 kg/cm) at 60° C. and curing reaction for 24 hours, obtaining a sample No. 1. The magnetic layer had a final thickness of 3.0 μm. Sample No. 1 was cut to a width of ½ inch, obtaining a video tape sample.

For evaluating the dispersibility of the resulting sample No. 1, it was measured for 60° gloss by means of a gloss meter, squareness ratio Br/Bm by means of a VSM, and surface roughness by means of a contact type surface roughness meter. For the evaluation of coating properties, the yield value of the magnetic paint prior to the addition of the curing agent was calculated from a Casson plot determined by means of a cone plate viscometer, and streaks at the coating surface immediately after drying were observed under an optical microscope with a magnifying power of 50× to count the number of streaks per millimeter transversely of the tape. Further, using a VCR deck for RF output measurement, the VHS video tape form of sample No. 1 was measured for reproduction output at 7 MHz. The results are collectively shown in Table 1.

Example 2

Sample No. 2 was obtained by the same procedure as Example 1 except that the amount of organic dye compound I added was changed to 1 part by weight. The resulting sample was evaluated as in Example 1. The results are collectively shown in Table 1.

Example 3

Sample No. 3 was obtained by the same procedure as Example 1 except that the following organic dye compound II was used instead of organic dye compound I. The resulting sample was evaluated as in Example 1. The results are collectively shown in Table 1.

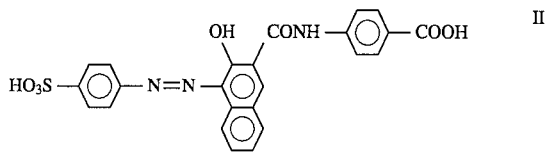

Example 4

Sample No. 4 was obtained by the same procedure as Example 1 except that the following organic dye compound III was used instead of organic dye compound I. The resulting sample was evaluated as in Example 1. The results are collectively shown in Table 1.

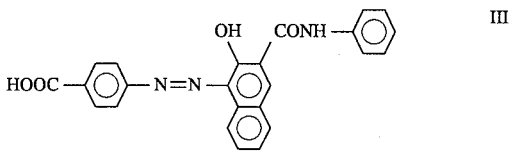

Example 6

Sample No. 5 was obtained by the same procedure as Example 1 except that the following organic dye compound IV was used instead of organic dye compound I. The resulting sample was evaluated as in Example 1. The results are collectively shown in Table 1.

TABLE 1

| Sample No. | Dispersant Compound | Amount (pbw) | Gloss (%) | Squareness ratio Br/Bm | Yield value (dyn · cm) | Surface roughness (nm) | Surface streaks (count) | RF output (dB) |
|---|---|---|---|---|---|---|---|---|
| 1 | I | 3 | 169 | 0.870 | 402 | 3.9 | 1 | +1.3 |
| 2 | I | 1 | 165 | 0.856 | 421 | 4.3 | 3 | +1.0 |
| 3 | II | 3 | 170 | 0.868 | 405 | 3.6 | 1 | +1.5 |
| 4 | III | 3 | 158 | 0.867 | 410 | 3.9 | 1 | +1.2 |
| 5 | IV | 3 | 167 | 0.866 | 410 | 3.9 | 1 | +1.1 |
| 6 | V | 3 | 168 | 0.868 | 406 | 3.8 | 0 | +1.4 |
| 7 | VI | 3 | 171 | 0.870 | 401 | 3.7 | 0 | +1.6 |
| 8 | VII | 3 | 169 | 0.868 | 403 | 3.7 | 1 | +1.5 |
| 9 (comparison) | phosphate | 3 | 151 | 0.831 | 485 | 6.8 | 11 | +0.6 |
| 10 (comparison) | — | 0 | 130 | 0.788 | 510 | 8.2 | 18 | 0.0 |

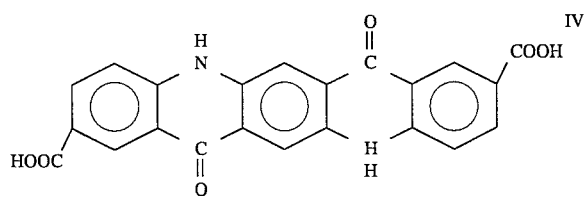

IV

Example 6

Sample No. 6 was obtained by the same procedure as Example 1 except that the following organic dye compound V was used instead of organic dye compound I. The resulting sample was evaluated as in Example 1. The results are collectively shown in Table 1.

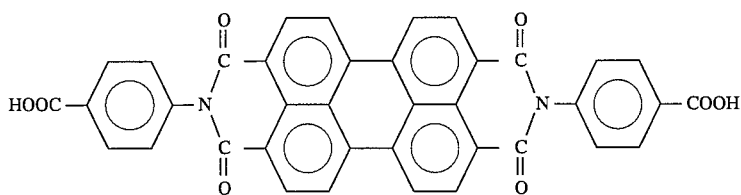

Example 7

Sample No. 7 was obtained by the same procedure as Example 1 except that the following organic dye compound VI was used instead of organic dye compound I. The resulting sample was evaluated as in Example 1. The results are collectively shown in Table 1.

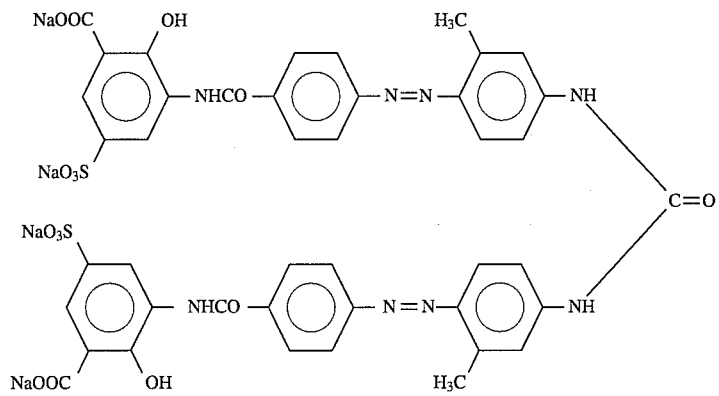

Example 8

Sample No. 8 was obtained by the same procedure as Example 1 except that the following organic dye compound VII was used instead of organic dye compound I. The resulting sample was evaluated as in Example 1. The results are collectively shown in Table 1.

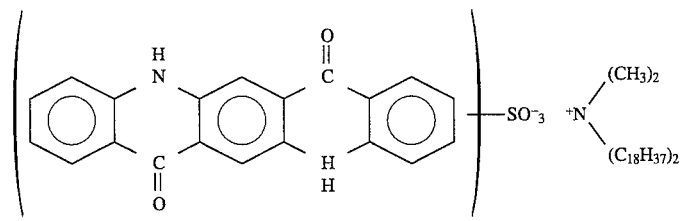

Comparative Example 1

Sample No. 9 was obtained by the same procedure as Example 1 except that a phosphate ester dispersant (RE-610, manufactured by Toho Chemical K.K.) was used instead of organic dye compound I. The resulting sample was evaluated as in Example 1. The results are collectively shown in Table 1.

Comparative Example 2

Sample No. 10 was obtained by the same procedure as Example 1 except that organic dye compound I was omitted. The resulting sample was evaluated as in Example 1. The results are collectively shown in Table 1.

V

Example 9

There was furnished a magnetic powder having a coercivity Hc of 950 Oe, a saturation magnetization σs of 96 emu/g, and a specific surface area of 48 m²/g as measured by a BET method. On X-ray diffractometry and SIMS analysis of this powder, the presence of iron carbide ($Fe_5C_2$)

VI at the surface was ascertained. Sample No. 11 was obtained by the same procedure as Example 1 except that this magnetic powder was used. The resulting sample was evaluated as in Example 1. Note that the RF output was measured with the measurement frequency changed from 7 MHz to 5 MHz. The results are collectively shown in Table 2.

VII

TABLE 2

| Sample No. | Dispersant Compound | Dispersant Amount (pbw) | Gloss (%) | Squareness ratio Br/Bm | Yield value (dyn·cm) | Surface roughness (nm) | Surface streaks (count) | RF output (dB) |
| --- | --- | --- | --- | --- | --- | --- | --- | --- |
| 11 | I | 3 | 171 | 0.885 | 364 | 3.9 | 1 | +1.9 |
| 12 | II | 3 | 170 | 0.887 | 362 | 3.8 | 0 | +1.8 |
| 13 | III | 3 | 169 | 0.886 | 360 | 3.9 | 0 | +1.8 |
| 14 | IV | 3 | 168 | 0.883 | 363 | 4.2 | 2 | +1.5 |
| 15 | V | 3 | 169 | 0.885 | 361 | 4.0 | 1 | +1.7 |
| 16 | VI | 3 | 172 | 0.888 | 359 | 3.8 | 0 | +2.0 |
| 17 | VII | 3 | 171 | 0.888 | 362 | 3.7 | 0 | +2.1 |
| 18 (comparison) | phosphate | 3 | 155 | 0.845 | 432 | 6.6 | 10 | +0.8 |
| 19 (comparison) | — | 0 | 132 | 0.795 | 471 | 7.9 | 15 | 0.0 |

Example 10

Sample No. 12 was obtained by the same procedure as Example 1 except that there were used the magnetic powder used in Example 9 and organic dye compound II used in Example 3. The resulting sample was evaluated as in Example 9. The results are collectively shown in Table 2.

Example 11

Sample No. 13 was obtained by the same procedure as Example 1 except that there were used the magnetic powder used in Example 9 and organic dye compound III used in Example 4. The resulting sample was evaluated as in Example 9. The results are collectively shown in Table 2.

Example 12

Sample No. 14 was obtained by the same procedure as Example 1 except that there were used the magnetic powder used in Example 9 and organic dye compound IV used in Example 5. The resulting sample was evaluated as in Example 9. The results are collectively shown in Table 2.

Example 13

Sample No. 15 was obtained by the same procedure as Example 1 except that there were used the magnetic powder used in Example 9 and organic dye compound V used in Example 6. The resulting sample was evaluated as in Example 9. The results are collectively shown in Table 2.

Example 14

Sample No. 16 was obtained by the same procedure as Example 1 except that there were used the magnetic powder used in Example 9 and organic dye compound VI used in Example 7. The resulting sample was evaluated as in Example 9. The results are collectively shown in Table 2.

Example 15

Sample No. 17 was obtained by the same procedure as Example 1 except that there were used the magnetic powder used in Example 9 and organic dye compound VII used in Example 8. The resulting sample was evaluated as in Example 9. The results are collectively shown in Table 2.

Comparative Example 3

Sample No. 18 was obtained by the same procedure as Comparative Example 1 except that there was used the magnetic powder used in Example 9. The resulting sample was evaluated as in Example 9. The results are collectively shown in Table 2.

Comparative Example 4

Sample No. 19 was obtained by the same procedure as Comparative Example 2 except that there was used the magnetic powder used in Example 9. The resulting sample was evaluated as in Example 9. The results are collectively shown in Table 2.

As understood from the results of Table 1 using a magnetic powder whose surface was composed mainly of carbon and the results of Table 2 using a magnetic powder whose surface was composed mainly of iron carbide, those samples using organic dye compounds according to the invention as a dispersant exhibited good results with respect to all of gloss, squareness ratio, yield value, surface roughness, the number of streaks extending longitudinally of tape, and RF output.

We claim:

1. A magnetic recording medium comprising on a non-magnetic substrate a magnetic layer containing a magnetic powder whose surface is composed mainly of carbon and/or iron carbide and a binder, said magnetic layer containing 0.5 to 10 parts by weight per 100 parts by weight of said magnetic powder an organic dye compound having a polar group, wherein said polar group is at least one selected from the group consisting of a hydroxyl group, a carboxylic acid group, a sulfonic acid group and a salt thereof, and wherein said binder contains at least one of an amino group or an ammonium salt group an wherein said binder contains about 300 to 1000 ppm of Nitrogen from the amino group or ammonium salt group in its molecules.

2. The magnetic recording medium of claim 1, wherein said magnetic powder is one obtained by previously kneading and dispersing a magnetic powder whose surface is composed mainly of carbon and/or iron carbide in a solvent.

3. The magnetic recording medium of claim 1, wherein a magnetic paint containing the magnetic powder whose surface is composed mainly of carbon and/or iron carbide, the binder, and the organic dye compound having a polar group is coated onto the non-magnetic substrate for improving coating defects at the surface of the magnetic layer.

4. The magnetic recording medium of claim 1, wherein said polar group is a hydroxyl group or salt thereof.

5. The magnetic recording medium of claim 1, wherein said polar group is a carboxylic acid group or salt thereof.

6. The magnetic recording medium of claim 1, wherein said polar group is a sulfonic acid group or salt thereof.

* * * * *

UNITED STATES PATENT AND TRADEMARK OFFICE
CERTIFICATE OF CORRECTION

PATENT NO. : 5,514,465
DATED : May 7, 1996
INVENTOR(S) : Takashi HANDA et al It is certified that error appears in the above-identified patent and that said Letters Patent is hereby corrected as shown below:

Column 14, line 54, "an" should read --and--.

Signed and Sealed this

Tenth Day of September, 1996

*Attest:*

BRUCE LEHMAN

*Attesting Officer*     *Commissioner of Patents and Trademarks*